United States Patent [19]

Peetz

[11] Patent Number: 4,570,960
[45] Date of Patent: Feb. 18, 1986

[54] OUTBOARD MOTOR CART

[76] Inventor: William F. Peetz, 301 W. 20th, The Dalles, Oreg. 97058

[21] Appl. No.: 601,068

[22] Filed: Apr. 16, 1984

[51] Int. Cl.[4] .................................................. B62B 1/26
[52] U.S. Cl. ........................... 280/47.13 R; 248/163.1; 280/79.1 A; 280/DIG. 2
[58] Field of Search ................. 280/47.13 R, 79.1 A, 280/DIG. 2; 248/640, 163.1 X, 172

[56] References Cited

U.S. PATENT DOCUMENTS

| | | | |
|---|---|---|---|
| 2,811,942 | 11/1957 | Pineider | 280/DIG. 2 |
| 2,822,183 | 2/1958 | Montgomery | 280/47.13 R |
| 2,966,319 | 12/1960 | Todish | 280/DIG. 2 |
| 4,044,978 | 8/1977 | Williams | 280/79.1 A |

*Primary Examiner*—John A. Pekar
*Assistant Examiner*—Joseph G. McCarthy
*Attorney, Agent, or Firm*—Lee R. Schermerhorn

[57] ABSTRACT

The cart has a clamp securing it to the cavitation plate on the stem of the motor. The cart stands upright on two rear wheels and a front leg, allowing it to be tilted and wheeled up or down stairs. An arched frame partially surrounds and protects the propeller.

5 Claims, 7 Drawing Figures

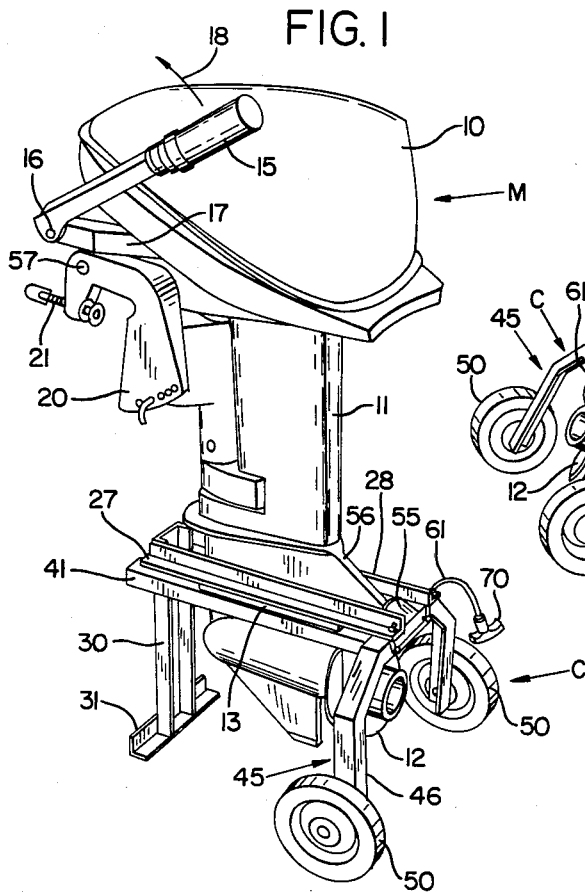
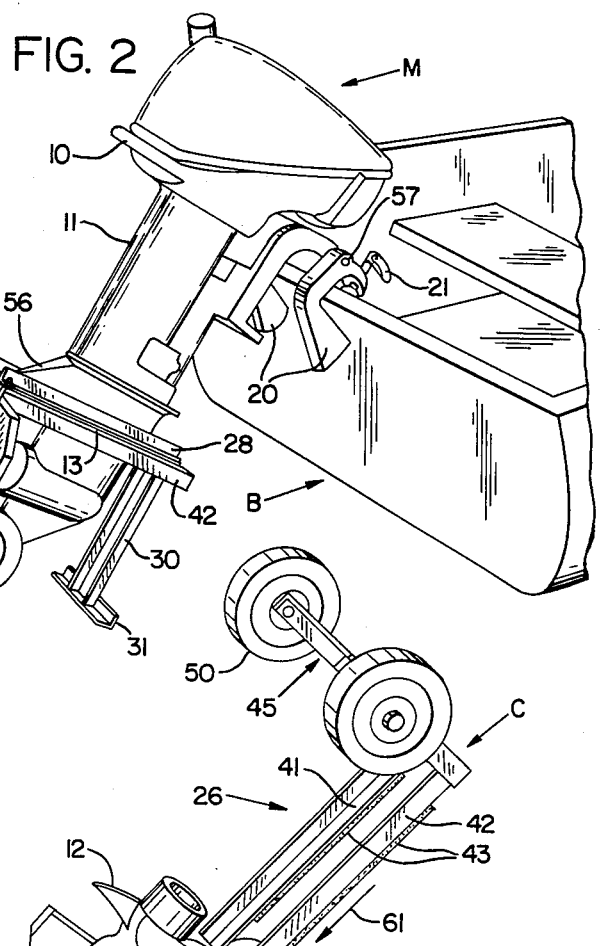
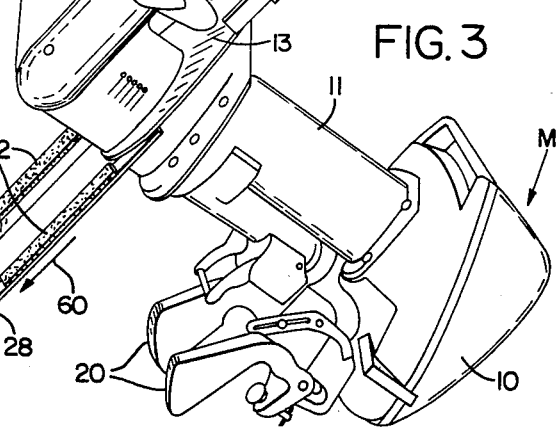
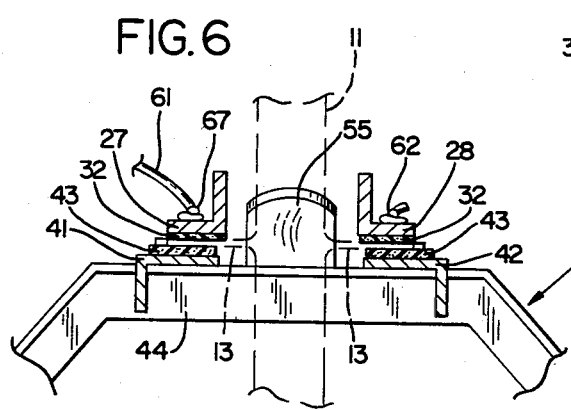
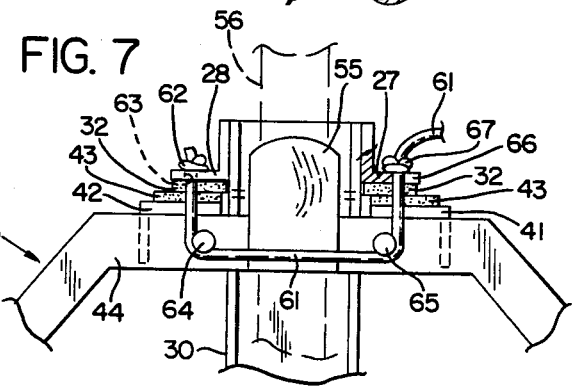

OUTBOARD MOTOR CART

BACKGROUND OF THE INVENTION

This invention relates to a cart for moving and storing outboard motors for boats.

The common type of outboard motor has a supporting bracket for removable mounting on the stern of a boat. When the boat is stored and when it is being transported over land it is common practice to remove the outboard motor and then mount the motor on the boat when the boat is ready to be placed in the water.

Outboard motors, particularly in large sizes, are quite heavy and awkward to handle while taking care not to damage the propeller and other rather delicate parts. This presents a difficult problem in mounting the motor on the boat, removing the motor from the boat and in moving and storing the motor apart from the boat. Prior to the present invention no simple and practical means has been developed to preform these functions.

SUMMARY OF THE INVENTION

The present cart has a clamp securing it to the cavitation plate on the stem of the motor above the propeller. For storage, the cart stands upright on two rear wheels and a front leg allowing the motor to be pulled or pushed and wheeled up or down stairs. An arched frame partially surrounds and protects the propeller.

A foot on the front leg provides a fixed pivot for tilting the cart and motor forward on a supporting surface in convenient position for mounting the motor on a boat and for removing the motor from the boat. The cart is readily removable from the motor, and readily applied to the motor, in these manipulations. When the motor is mounted on the cart the cart is tilted backward for travel on its two wheels.

The invention will be better understood and additional features and advantages will become apparent from the following detailed description of the preferred embodiment illustrated in the accompanying drawings. Various changes may be made in the details of construction and arrangement of parts and certain features may be used without others. All such modifications within the scope of the appended claims are included in the invention.

BRIEF DESCRIPTION OF THE DRAWING

FIG. 1 is a perspective view showing the present cart and motor standing in upright position.

FIG. 2 is a perspective view showing the cart tilted forward in position for mounting the motor on a boat or for removing the motor.

FIG. 3 is a perspective view from underneath showing the two parts of the cart in exploded view.

FIG. 6 is a view on the line 6—6 in FIG. 4.

FIG. 7 is a view on the line 7—7 in FIG. 4.

DESCRIPTION OF THE PREFERRED EMBODIMENT

Figure 4:
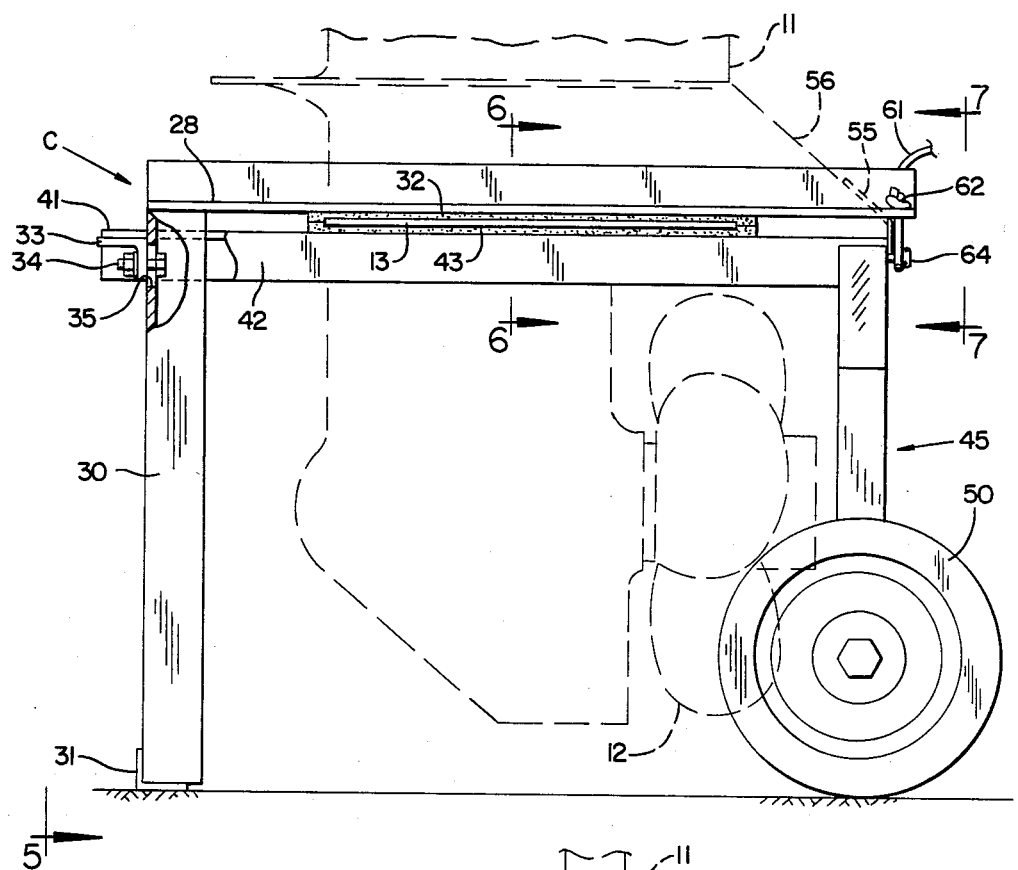
FIG. 4 is a side elevation view with parts in section, including the lower part of the motor in phantom, showing how the two parts of the cart are mounted on the cavitation plate of the motor.

Referring first to FIGS. 1-3 the conventional outboard motor has a motor housing 10 containing an internal combustion engine and fuel tank mounted on the upper end of a vertical stem 11. Stem 11 contains a drive shaft for rotating propeller 12 on the lower end of the stem. A flat, horizontal cavitation plate 13 is mounted on stem 11 just above the propeller 12.

Steering of the boat is accomplished by a steering arm 15 connected through a horizontal pivot 16 an an arm 17 extending forward from motor housing 10. In FIG. 1 the steering arm 15 is pivoted rearward to inoperative position. In the operative position steering arm 15 is swung forward in the direction of arrow 18 to a horizontal position as a forward extension of horizontal arm 17.

Motor housing 10 and stem 11 are mounted on a vertical pivot (not shown) in a conventional mounting bracket 20 which is mounted on the stern of boat B by clamp screws 21 as shown in FIG. 2. In transferring the motor M from boat B to cart C clamp 20 is released from the boat by loosening clamp screws 21 whereby clamp 20 and motor M are removed as a unit and clamp 20 remains with the motor as an intergral part thereof.

As seen from underneath in FIG. 3 the cart C is made in two parts, these being a front frame 25 and a rear frame 26, shown in exploded view. Front frame 25 comprises left and right horizontal top rails 27 and 28 fixedly mounted at their front ends on the outside edge flanges on the upper end of vertical front leg 30. The lower end of leg 30 is connected to a horizontal foot bar 31. A plastic cushion strip 32 is mounted on the underside of each top rail 27 and 28.

A horizontal cross bar 33 is mounted on front leg 30 just below the level of rails 27 and 28. Cross bar 33 is vertically adjustable by a pair of bolts and nuts 34 in a pair of vertical slots 35 in leg 30 as shown in FIGS. 4 and 5.

Referring back to FIG. 3, rear frame 26 comprises a pair of parallel horizontal bottom rails 41 and 42, each having a plastic cushion strip 43 adhered to the top surface thereof. The rear end of each rail 41 and 42 is fixedly mounted on a horizontal top portion 44 of an an inverted U-shaped wheel arch 45 as shown in FIG. 7.

Figure 5:
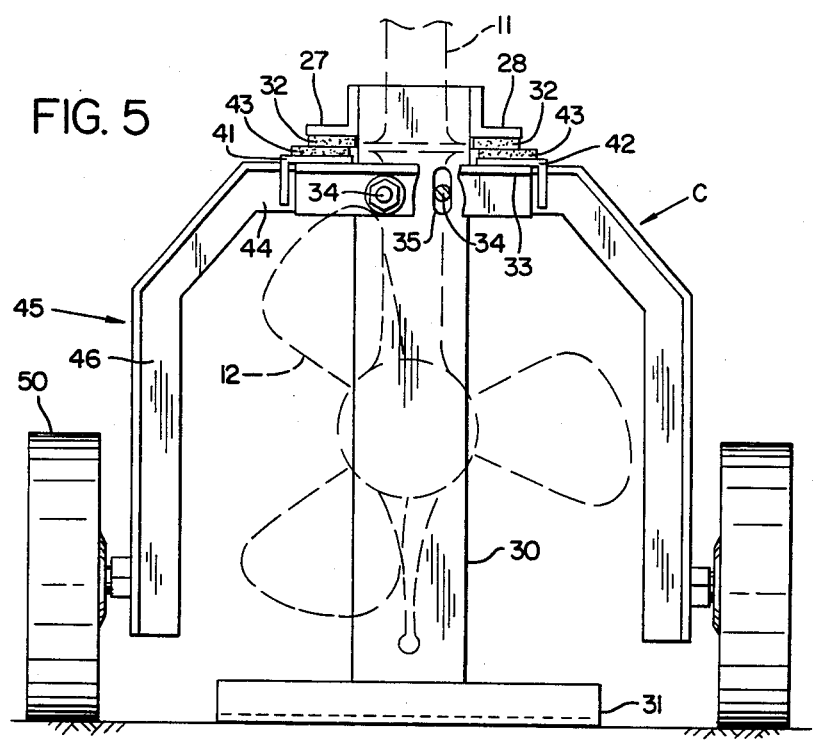
FIG. 5 is a view on the line 5—5 in FIG. 4, with parts broken away.

Wheel arch 45 has a pair of vertical lower portions forming legs 45, each equipped with a cart wheel 50 as shown in FIG. 4. When the motor M is mounted in cart C the wheel arch 45 extends around the top and opposite sides of propeller 12 and is slightly to the rear of the propeller as seen in FIG. 4, to protect the propeller.

A curved hang strap or lug 55 projects upward and forward from the center of horizontal top bar 44 of the wheel arch 45 to overlie a rearward projecting portion 56 on the lower end of motor stem 11 as seen in FIGS. 1, 4, 6 and 7.

To assemble the two parts 25 and 26 of the cart C on the motor M, as for example in removing the motor from the boat B, the motor is tilted to a convenient angle as shown in FIG. 2. Then front frame top rails 27 and 28 are applied to the top surface of cavitation plate 13 and rear frame bottom rails 41 and 42 are applied to the bottom surface of the cavitation plate.

Rear frame 26 is moved forward until lug 55 engages over the rear end of projection 56 on the motor stem and front frame 25 is moved rearward until the rear ends of bottom rails 41 and 42 pass over the top edge of cross bar 33 on the front frame as shown in FIGS. 4 and 5. Then the free rear ends of top rails 27 and 28 are secured to the top bar 44 on wheel arch 45 to clamp the opposite sides of the cavitation plate 13 between the cushion strips 32 and 43. Thus lug 55 positions the cart on the motor.

This clamping function at the rear ends of the rails is accomplished in the present embodiment by a short length of cord 61 as shown in FIGS. 4 and 7. One end of the cord has a knot 62 with the cord passing through a hole 63 in top rail 28, around pins 64, 65 on the rear side of top bar 44 in wheel arch 45 and up through a transverse slot 66 in top rail 27 where the cord is retained by a second knot 67. Knot 67 is positioned on the cord so as to require some degree of compression of the plastic cushion strips 32 and 43 when the cord is tensioned through slot 66.

The free end of cord 61 is equipped with a handle 70 as seen in FIG. 1. Thus the two parts 25 and 26 of the cart C are clamped together on cavitation plate 13 so that the cart is securely attached to the motor M. When this operation is completed the motor is tilted down in FIG. 2 until the foot 31 on front leg 30 rests on a supporting surface and the clamp screws 21 may be released from the boat and the cart tilted upright to rest on front leg 30 and wheels 50 as shown in FIG. 1. These operations are reversed in transfering the motor from the cart to the boat.

The motor and cart may be wheeled by grasping the motor housing 10 and tilting the motor and cart back on its wheels 50. In this backward tilted position the cart may be wheeled up and down stairs to a desired place of storage.

The cart frames 25 and 26 may also be applied to the motor by inverting the motor and resting it on a floor, supported by motor housing 10 and bracket 20 as shown in FIG. 3. This places cavitation plate 13 in a conveniently accessible position. Lug 55 positions the cart in a fore and aft direction and centers the rear end of the cart in a lateral direction on the motor stem 11.

The cart also stabilizes the outboard motor in horizontal position as for example in transportation in an automobile. This is accomplished by tipping the motor and cart backward, to the right from its upright position in FIG. 1, until the rear portion of the cowling on motor housing 10 rests on the supporting surface. This provides stable three point support on motor housing 10 and the two wheels 50. Without the cart the outboard motor has no stable position and tends to roll back and forth with the motion of an automobile.

What is claimed is:

1. A cart for moving and storing marine outboard motors of the type having a vertical stem with a motor on the upper end of the stem and a propeller and horizontal cavitation plate on the lower end of the stem, comprising a pair of horizontal rails engageable with one face of said cavitation plate on opposite sides of said stem, means engageable with the opposite face of said cavitation plate to clamp said cavitation plate against said rails, a support leg at one end of said rails, a pair of support legs at the opposite end of said rails and wheels on said pair of legs, said first leg being a front leg and said pair of legs being rear legs, said pair of rear legs and said wheels being disposed on opposite lateral sides of said propeller, said pair of rear legs assuming the shape of an arch around the top and sides of the propeller, said clamping means comprising a second pair of rails on opposite sides of said stem parallel with said first rails, said first pair of rails being integral with said front leg and engaging the top face of said cavitation plate said second pair of rails being integral with said rear legs and engaging the bottom face of said cavitation plate.

2. A cart for moving and storing marine outboard motors of the type having a vertical stem with a motor on the upper end of the stem and a propeller and horizontal cavitation plate on the lower end of the stem, comprising a front frame and a rear frame and means for clamping said cavitation plate between parts of said front and rear frames to secure the cart to the outboard motor, said front frame having a front leg in front of said stem and said rear frame having a pair of rear legs behind said propeller, said rear legs being equipped with wheels on opposite lateral sides of said propeller, said pair of rear legs assuming the shape of an arch around the top and sides of said propeller, said means for clamping said cavitation plate comprising a pair of rails on said front leg arranged to engage one face of said cavitation plate and a pair of rails on said arch arranged to engage the opposite face of the cavitation plate, a layer of cushion material on the plate engaging surface of each of said rails, said rails on said front leg engaging the top face of the cavitation plate and said rails on said arch engaging the bottom face of the cavitation plate, and a cross bar on said front leg to support the front ends of said rails on said arch.

3. A cart as defined in claim 2 including a lug on said arch to engage a portion of said stem and position said arch on said stem.

4. A cart as defined in claim 3 including means to clamp the rear ends of said rails on said front leg down against said arch.

5. A cart as defined in claim 4, said last clamping means comprising a rope tie.

* * * * *